US009681288B2

(12) United States Patent
Mueck et al.

(10) Patent No.: US 9,681,288 B2
(45) Date of Patent: *Jun. 13, 2017

(54) METHODS AND APPARATUSES FOR DETERMINING CELL ACCESS DURING A CELL SEARCH

(71) Applicant: INTEL DEUTSCHLAND GMBH, Neubiberg (DE)

(72) Inventors: Markus Dominik Mueck, Unterhaching (DE); Thomas Ruprich, Munich (DE); Andreas Schmidt, Braunschweig (DE); Hyung-Nam Choi, Hamburg (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 168 days.

This patent is subject to a terminal disclaimer.

(21) Appl. No.: 14/615,124

(22) Filed: Feb. 5, 2015

(65) Prior Publication Data

US 2015/0156621 A1    Jun. 4, 2015

Related U.S. Application Data

(63) Continuation of application No. 13/419,136, filed on Mar. 13, 2012, now Pat. No. 8,989,748, which is a
(Continued)

(51) Int. Cl.
*H04W 8/02* (2009.01)
*H04J 11/00* (2006.01)
(Continued)

(52) U.S. Cl.
CPC ........... *H04W 8/02* (2013.01); *H04J 11/0069* (2013.01); *H04W 48/08* (2013.01); *H04W 56/00* (2013.01)

(58) Field of Classification Search
CPC ....... H04W 8/02; H04W 56/00; H04W 48/08; H04J 11/0069
See application file for complete search history.

(56) References Cited

U.S. PATENT DOCUMENTS

2002/0197984 A1    12/2002  Monin et al.
2004/0106379 A1     6/2004  Zen et al.
(Continued)

FOREIGN PATENT DOCUMENTS

CN    1655630 A    8/2005
EP    1061759 A1   12/2000
(Continued)

OTHER PUBLICATIONS

C. Studer, H. Bolcskei, "Soft-Input Soft-Output Single Tree Search Sphere Decoding". IEEE Transactions on Information Theory, vol. 56 No. 10, pp. 4827-4842, Oct. 2010.
(Continued)

*Primary Examiner* — Pao Sinkantarakorn
*Assistant Examiner* — Kabir Jahangir
(74) *Attorney, Agent, or Firm* — Schwabe, Williamson & Wyatt, P.C.

(57) ABSTRACT

In an embodiment, a method for determining the type of a mobile radio base station is provided. The method may include receiving a synchronization message comprising a mobile radio base station identifier, and determining the type of a mobile radio base station using a previously signaled and stored piece of mobile radio base station type determining information indicating a rule as to how the type of a mobile radio base station out of a plurality of types of a mobile radio base station can be derived from a mobile radio base station identifier and the received mobile radio base station identifier.

27 Claims, 7 Drawing Sheets

Related U.S. Application Data continuation of application No. 12/233,119, filed on Sep. 18, 2008, now Pat. No. 8,160,590.

(51) Int. Cl.
*H04W 48/08* (2009.01)
*H04W 56/00* (2009.01)

(56) References Cited

U.S. PATENT DOCUMENTS

| | | | |
|---|---|---|---|
| 2004/0152472 | A1 | 8/2004 | Ono et al. |
| 2007/0070938 | A1 | 3/2007 | Hori et al. |
| 2008/0102877 | A1 | 5/2008 | Suemitsu et al. |
| 2009/0047968 | A1 | 2/2009 | Gunnarsson et al. |
| 2009/0086672 | A1 | 4/2009 | Gholmieh et al. |
| 2009/0239533 | A1 | 9/2009 | Somasundaram et al. |
| 2009/0270096 | A1 | 10/2009 | Somasundaram et al. |
| 2009/0323957 | A1 | 12/2009 | Luo et al. |

FOREIGN PATENT DOCUMENTS

| | | |
|---|---|---|
| EP | 1271852 A2 | 1/2003 |
| JP | 2007096522 A | 4/2007 |
| WO | 0074418 A2 | 12/2000 |
| WO | 2008016246 A1 | 2/2008 |
| WO | 2008041573 A1 | 4/2008 |

OTHER PUBLICATIONS

F. Borlenghi et al., "A 2.78 mm2 65nm CMOS Gigabit MIMO Iterative Detection and Decoding Receiver". Proceedings of the European Solid-State Circuits Conference (ESSCIRC), pp. 65-68 Sep. 2012.
B. Hochwald, S. Ten Brink, "Achieving Near-Capacity on a Multiple-Antenna Channel". IEEE Transactions on Communications, vol. 51, No. 3, pp. 389-399, Mar. 2003.
C. Studer, S. Fateh, D. Seethaler, "A 757 Mb/s 1.5mm2 90 nm CMOS Soft-Input Soft-Output MIMO Detector for IEEE 802.11n". IEEE Proceedings of the European Solid-State Circuits Conference, pp. 530-533, Sep. 2010.
C. Studer, S. Fateh, D. Seethaler, "ASIC Implementation of Soft-Input Soft-Output MIMO Detection Using MMSE Parallel Interference Cancellation". IEEE Journal of Solid-State Circuits, vol. 46, No. 7, pp. 1754-1765, Jul. 2011.
E. M. Witte et al., "A Scalable VLSI Architecture for Soft-Input Soft-Output Single Tree Search Sphere Decoding". IEEE Transactions on Circuits and Systems II: Express Briefs, vol. 57, No. 9, pp. 706-710, Sep. 2010.
C.H. Liao et al., "Combining Orthogonalized Partial Metrics: Efficient Enumeration for Soft-Input Sphere Decoder". Proceedings of the IEEE International Symposium on Personal, Indoor and Mobile Radio Communications, pp. 1287-1291, Sep. 2009.
B. Wu, G. Masera, "Efficient VLSI Implementation of Soft-Input Soft-Output Fixed-Complexity Sphere Decoder". IET Communications, vol. 6, No. 9, pp. 1111-1118, Jun. 2012.
3GPP TS 31.102 V8.2.0 (Jun. 2008); Technical Specification; 3rd Generation Partnership Project; Technical Specification Group Core Network and Terminals; Characteristics of the Universal Subscriber Identity Module (USIM) application (Release 8), 188 pages.
3GPP TS 36.331 V8.2.0 (May 2008); Technical Specification; 3rd Generation Partnership Project; Technical Specification Group Radio Access Network; Evolved Universal Terrestrial Radio Access (E-UTRA) Radio Resource Control (RRC): Protocol specification (Release 8), 151 pages.
"3GPP TSG-RAN WG1 #53bis;""Extended PCI set for CSG cells""; Infineon Technologies, Jun. 30-Jul. 4, 2008, Warsaw, Poland, 64 pages. cited by applicant . International Preliminary Report on Patentability received for International Application No. PCT/EP2009/006122, issued Feb. 28, 2012, 12 pages".
"International Preliminary Report on Patentability received for International Application No. PCT/EP2009/006122, issued Feb. 28, 2012, 12 pages".
"International Search Report received for International Application No. PCT/EP2009/006122, issued Feb. 24, 2012, 4 pages".
Written Opinion received for International Application No. PCT/EP2009/006122, issued Feb. 24, 2012, 11 pages
Helleboogh, "Stimulation of Distributed Control Applications in Dynamic Enironments", (May 2007), XP002575544, ISBN: 978-90-5682-835-6, Retrieved from the Internet: URL:https://lirias.kuleuven.be/bitstream/123456789/156213/1/PhD.sub.--ale- xander.sub.--Hellboogh.sub.--totaal.pdf, retrived on Mar. 25, 2010, 214 pages.
Rieffel et al., "Evolving Soft Robotic Locomotion in PhysX", Jul. 8, 2009, XP002575545, Montreal, Canada, Retrieved from the Internet: URL:http://cs.union.edu/{rieffelj/papers/rieffel-gecco-2009.pdf, retrieved on Mar. 26, 2010, 6 pages.
Masatomo et al., Using a GPU to Accelerate Die an Mold Fabrication, XP011154593, IEEE computer Graphics and Applications, Jan. 1, 2007 IEEE Service Center, New York, NY, US—ISSN 0272-1716, http://dx.doi.org/10.1109/MCG.2007.23, vol. 27, Nr:1, pp. 82-88.
Ogata et al., "An efficient, model-based CPU-GPU heterogeneous", FFT library, XP031268135, 2008 IEEE International Symposium on Parallel & Distributed Processing : [IPDPS 2008] ; Miami, FL, Apr. 14-18, 2008, Apr. 14, 2008 IEEE, Piscataway, NJ, USA— ISBN 978-1-4244-1693-6 ; ISBN 1-4244-1693-0, pp. 1-10.
Wook et al., "Real-time distributed software-in-the-loop simulation for distributed control systems", Computer Aided Control System Design, 1999. Proceedings of the 1999 IE EE International Symposium on Kohala Coast, HI, USA Aug. 22-27, 1999, Aug. 22, 1999; Aug. 22, 1999-Aug. 27, 1999 Piscataway, NJ, USA,IEEE, US— ISBN 978-0-7803-5500-2 ; ISBN 0-7803-5500-8, pp. 115-119.
Mahalik et al., "Design and development of system level software tool for DCS simulation", XP002575547, Advances in Engineering Software, Jul. 1, 2003 Elsevier Science, Oxford, GB—ISSN 0965-9978, http://dx.doi.org/10.1016/S0965-9978(03)00031-0, Nr:7, pp. 451-465, Jul. 1, 2003.
First Office Action received in Chinese Patent Application No. CN200980136653.X, issued Apr. 22, 2013, 13 pages, with English translation.
Second Office Action received in Chinese Patent Application No. CN200980136653.X, issued Jan. 6, 2014, 17 pages, with English translation.
Third Office Action received in Chinese Patent Application No. CN200980136653.X, issued Jul. 9, 2014, 18 pages, with translation.
European Patent Office; Examination Report for European App. No. 09782414.8 dated Feb. 21, 2012; 3 pages.
3GPP TS 36.211 V8.3.0 (May 2008); "Technical Specification Group Radio Access Network; Evolved Universal Terrestrial Radio Access (E-UTRA); Physical Channels and Modulation (Release 8)," 77 pages.

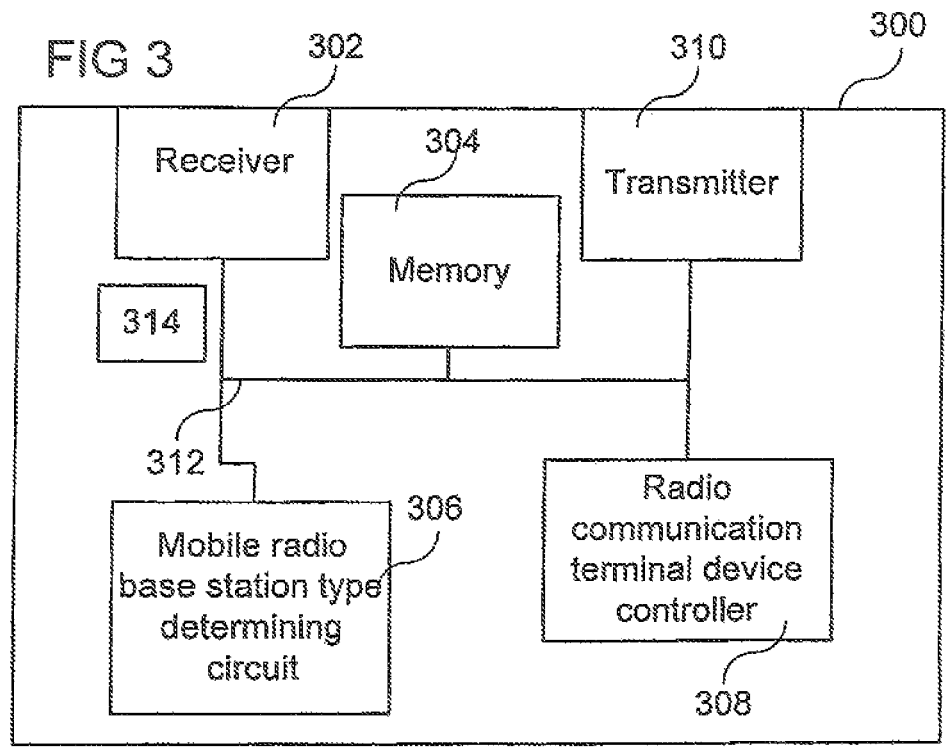
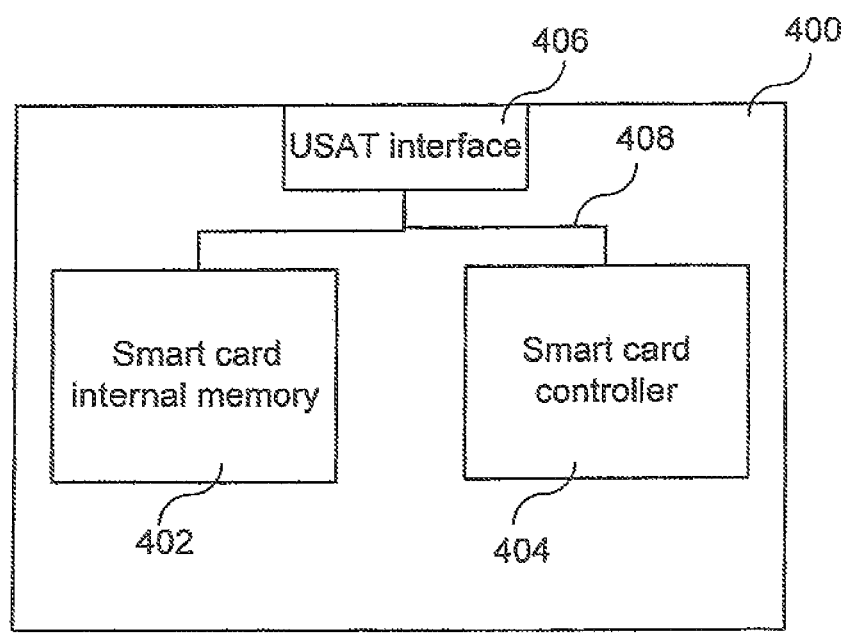

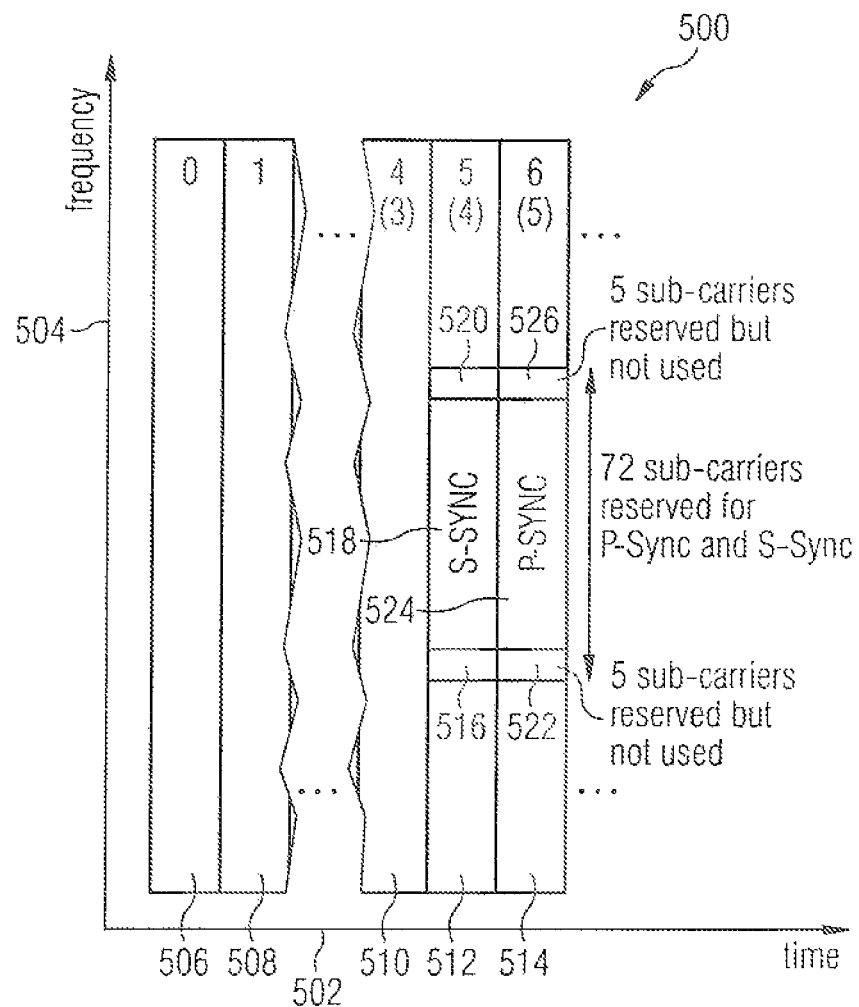

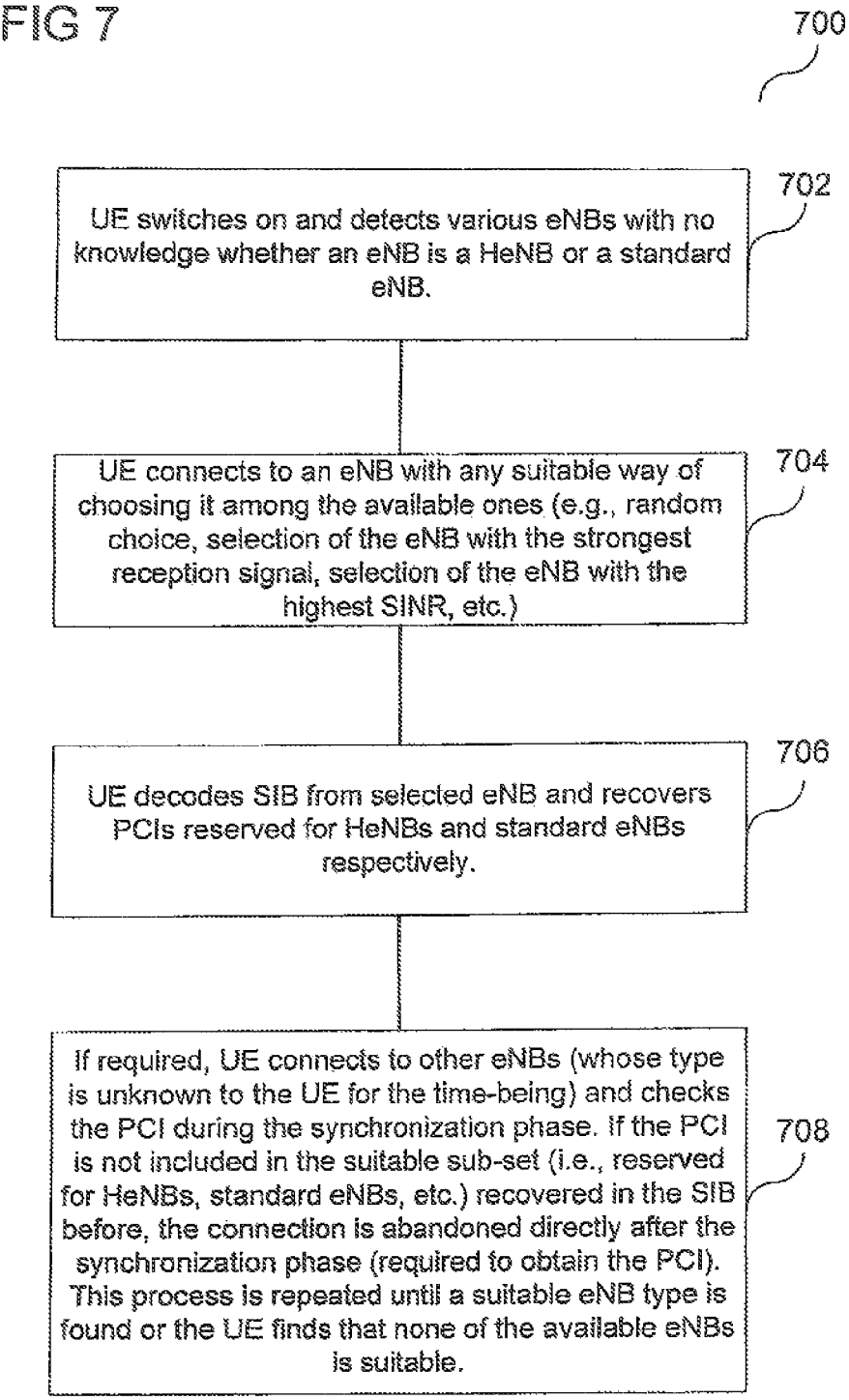

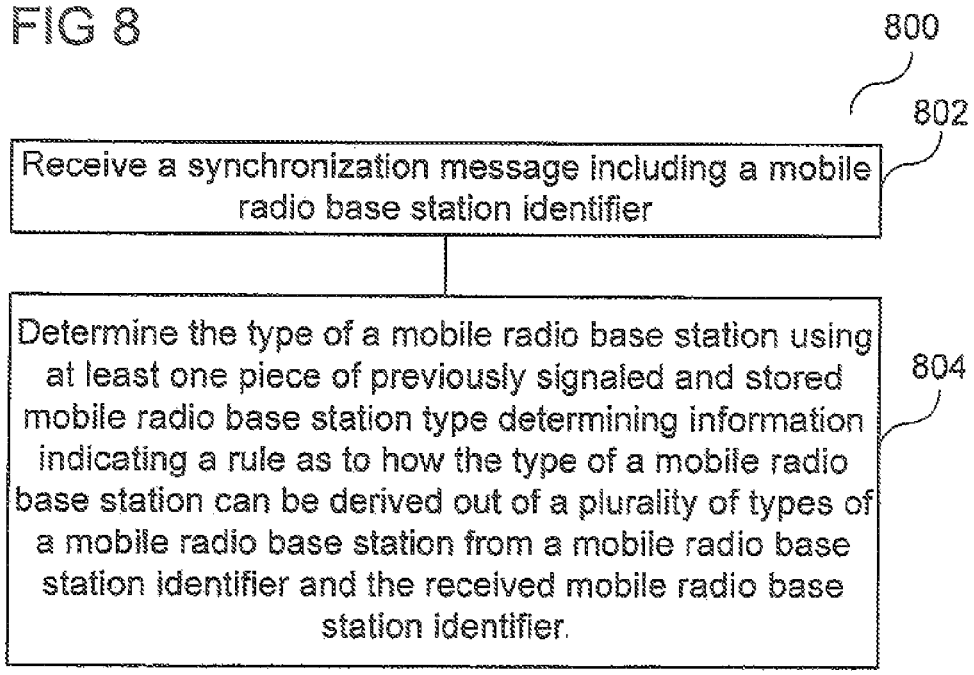
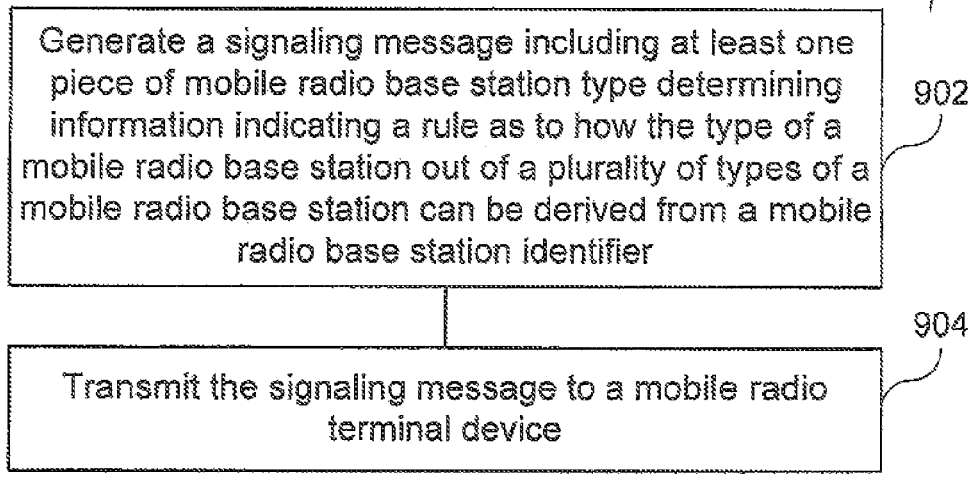

METHODS AND APPARATUSES FOR DETERMINING CELL ACCESS DURING A CELL SEARCH

CROSS REFERENCE TO RELATED APPLICATION

This application is a continuation of U.S. patent application Ser. No. 13/419,136, filed Mar. 13, 2012, which is a continuation of U.S. patent application Ser. No. 12/233,119, filed Sep. 18, 2008, now U.S. Pat. No. 8,160,590, issued Apr. 17, 2012, the contents and disclosures of which are hereby incorporated by reference in their entireties.

TECHNICAL FIELD

Embodiments relate generally to a method for determining the type of a mobile radio base station, a radio communication terminal device, a radio communication network device, and a radio communication smart card device.

BACKGROUND

A current topic in the 3GPP RAN (Third Generation Partnership Project Radio Access Network) working groups is the mobility of UEs (User Equipments) between macro cells of eNBs (evolved NodeBs) and micro cells of HeNBs (Home evolved NodeBs). A User Equipment (UE) is expected to be in an area with radio coverage guaranteed by standard 3GPP LTE (Long Term Evolution) Macro-Cells (also referred to as macro radio cells in the following) served by eNBs and/or Micro-Cells (also referred to as micro radio cells in the following) served by HeNBs. Depending on various criteria, such as subscription type, user profile and so on, the UE may be allowed to access an HeNB or not. Furthermore, the UE may have certain other priorities, e.g., related to radio link quality, QoS, etc., on whether to prefer connections to a HeNB or a standard eNB.

The current status in 3GPP RAN working groups regarding the identification of macro radio cells served by eNBs and micro radio cells served by HeNBs is as follows:

The need for a method was identified to distinguish both types of mobile radio base stations (BS) such as e.g. eNB and HeNB in an early stage of the mobile radio cell acquisition procedure. One approach is the reservation of the available set of PCIs (Physical layer Cell Identities) for such micro radio cells (HeNBs). One alternative approach is the extension of the current set of available PCIs by providing additional primary synchronisation signals (PSS) and to reserve this additional set of PCIs for micro radio cells. An open issue is whether the UE should be aware of the reserved set of PCIs for HeNBs or not.

In case that the UE is not aware of the reserved set of PCIs for HeNBs, the conventional solution requires that a UE synchronizes to an unknown BS (independent of whether it is an eNB or HeNB) and—in a second step—acquires and decodes the System Information (SI) of the mobile radio communication system in order to identify the type of the BS. The inherent process is relatively lengthy and the power requirements for performing all required steps may be high. This may have a direct impact on a variety of UE performance aspects, such as battery lifetime of the UE, and duration to perform handover from a macro cell (eNB) to a micro cell (HeNB) (cell type detection speed), which may lead to better QoS (Quality of Service) for the user at start-up (when UE is switched on) or during handover to another BS.

In order to extract the SI, the following broadcasting structure is to be taken into account: System Information (SI) is broadcast in the downlink transmission connection as an RRC (Radio Resource Control Protocol Layer) message carrying a number of System-Information-Blocks (SIBs) that have the same periodicity. Several SIBs have been defined including the so-called Master-Information-Block (MIB), that includes a limited number of most frequently transmitted parameters, and SIB Type 1 containing the scheduling information that mainly indicates when the other System Information (SI) RRC messages are transmitted, i.e. their start times.

SYSTEM INFORMATION MASTER (SI-M) and SYSTEM INFORMATION 1 (SI-1) are special versions of a System Information (SI) RRC message only carrying a single SIB, namely the MIB and the SIB Type 1, respectively. The SI-M message are carried on BCH (Broadcast Channel, one of the downlink transport channels) while all other System Information (SI) RRC messages including SI-1 are carried on DL-SCH (Downlink Shared Channel, another one of the downlink transport channels).

Both the SI-M and SI-1 use a fixed schedule with a periodicity of 40 ms and 80 ms, respectively. The first transmission of the SI-M is scheduled in radio frames for which the SFN mod 4=0. SI-1 is scheduled in radio frames for which the SFN mod 8=0. Moreover, SI-1 is scheduled in sub-frame #5. In this context, SFN is the mobile radio cell system frame number.

Furthermore and for reasons of completeness, it should be pointed out that the technique presented herein below is not related to the signaling of a "Neighbouring List". A neighbouring list (also called "Neighbour Cell List") gives specific identities of mobile radio base stations that are available in the neighbourhood and to which a communication connection is possible. This is unsuitable in the framework of the embodiments which will be described in the following, since the intention is to communicate a list of identities that are allocated to specific types of mobile radio base stations (BS) (e.g. HeNBs, standard eNBs, partially open HeNBs, etc.)—the signaling of the identities does not imply that the mobile radio base station of the corresponding identities are actually available. Typically, the ID range of a specific mobile radio base station type will be quite broad (e.g., 256 values among all available ones) while only a small number is actually deployed.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which:

FIG. 3 shows a radio communication terminal device in accordance with an embodiment;

FIG. 4 shows a radio communication smart card device in accordance with an embodiment;

FIG. 5 shows a time/frequency diagram in accordance with an embodiment;

FIG. 7 shows a flow diagram in accordance with an embodiment;

FIG. 8 shows a flow diagram illustrating a method for determining the type of a mobile radio base station in accordance with an embodiment; and FIG. 9 shows a flow diagram illustrating a method for signaling a mobile radio base station type determining information in accordance with an embodiment.

DESCRIPTION

Figure 1:
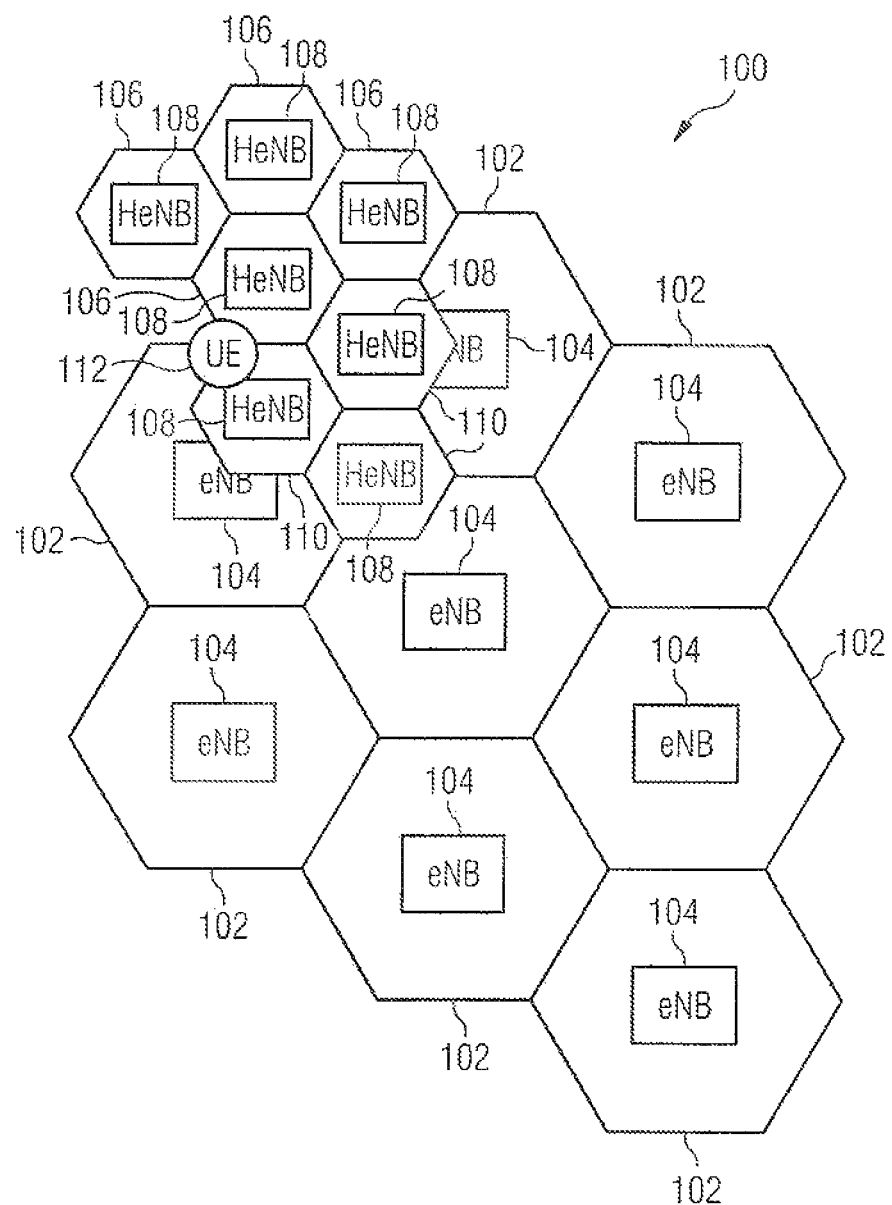
FIG. 1 shows a communication system in accordance with an embodiment.

In the description, the terms "connection" and "coupling" are intended to include a direct as well as an indirect "connection" and "coupling", respectively.

Furthermore, in an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java, thereby e.g. implementing an individually programmed circuit. Any other kind of implementation of the respective functions which will be described in more detail below may also be understood as a "circuit" in accordance with an alternative embodiment. In an embodiment, a plurality of circuits may be partially or completely implemented in one common circuit such as e.g. in one common processor such as e.g. one common microprocessor.

A "controller" may be understood as any kind of a control logic implementing entity, which may be hardware, software, firmware, or any combination thereof. A "controller" may include one or a plurality of processors, e.g. one or a plurality of programmable processors such as e.g. one or a plurality of programmable microprocessors. A "controller" may also be software being implemented or executed by a processor, e.g. any kind of computer program, e.g. a computer program using a virtual machine code such as e.g. Java, thereby e.g. implementing an individually programmed circuit. Any other kind of implementation of the respective functions which will be described in more detail below may also be understood as a "controller" in accordance with an alternative embodiment. A controller may alternatively or in addition include one or a plurality of application-specific integrated circuits (ASICs) and/or one or a plurality of programmable gate arrays (PGAs), e.g. field programmable gate arrays (FPGAs).

While in the following focus is put on UE mobility from an LTE macro radio cell (eNB) to an LTE micro cell (HeNB), it needs to be pointed that the described embodiments can be easily applied to Inter-RAT Handover scenarios (e.g., mobility from a UMTS macro radio cell to an LTE micro radio cell, etc.).

Various embodiments allow more flexibility for mobile network operators (MNO) to configure and deploy their mobile communication radio networks. For instance, a first mobile network operator MNO_A may choose to deploy a PCI (Physical layer Cell Identity) value range (or PCI calculation rule) different from the one a second mobile network operator MNO_B uses. Another effect of one or more embodiments may be that the PCI value assignment can even vary depending on the location within one MNO's domain.

FIG. 1 shows a communication system 100 (e.g. a mobile radio communication system 100) in accordance with an embodiment.

In an embodiment, the communication system 100 may include a plurality of macro radio cells 102, wherein at least one mobile radio base station 104 (e.g. in the case of 3GPP LTE, at least one eNodeB 104) is provided for radio coverage within a respectively assigned macro radio cell 102. Furthermore, the communication system 100 may include a plurality of micro radio cells 106, wherein at least one mobile radio home base station 108 (e.g. in the case of 3GPP LTE, at least one HeNodeB 108) is provided for radio coverage within a respectively assigned micro radio cell 106.

In 3GPP (3$^{rd}$ Generation Partnership Project), concepts are developed for supporting the deployment of so-called 'Home NodeBs' or 'Home eNodeBs' (HeNodeB) for the following Radio Access Technologies, for example:

3G UMTS (UMTS based on Code Division Multiple Access (CDMA), also referred to as 'UTRA' in 3GPP terminology);

and its successor technology 3.9G 3GPP LTE (Long Term Evolution, also referred to as 'E-UTRA' in 3GPP terminology).

A 'Home NodeB' or 'Home eNodeB' may be understood in accordance with 3GPP as a trimmed-down version of a base station optimized for use in residential or corporate environments (e.g., private homes, public restaurants or small office areas).

In an embodiment, access to a 'Home NodeB' may be allowed for a closed user group only, i.e. the communication service offering may be restricted to employees of a particular company or family members, in general, to the members of the closed user group. This kind of 'Home Base Stations' may be referred to as 'Closed Subscriber Group Cells' (CSG Cells) in 3GPP. A cell which indicates being a CSG Cell may need to provide its CSG Identity to the UEs. Such a cell may only be suitable for a UE if its CSG Identity is in the UE's CSG white list (a list of CSG Identities maintained in the UE or in an associated smart card indicating the cells which a particular UE is allowed to use for communication). It can be anticipated that HeNBs are typically operated in CSG mode with access restrictions. In this context the terminology "Partially Open Cell" may refer to a mobile radio cell that is configured to allow parts of its resources to be accessed by non-CSG-member UEs. This type of a semi-open CSG cell represents a specific type of a mobile radio Base Station that may also require distinction from 'normal' macro and micro cells, respectively.

As shown in FIG. 1, there may be physical areas in which there is radio coverage provided by one or more mobile radio base stations (macro radio cells) and also by one or more mobile radio home base stations (micro radio cells). These overlapping areas are designated in FIG. 1 with the reference number 110. Furthermore, one or a plurality of mobile radio communication terminal devices 112 such as e.g. User Equipments (UEs) 112 may be provided in the communication system 100. In FIG. 1, only one UE 112 is shown for reasons of simplicity. In general, an arbitrary number of mobile radio communication terminal devices 112 may be provided in the communication system 100. As shown in FIG. 1, the UE 112 may be located in an area in which it can receive mobile radio signals from a plurality of different mobile radio base stations 104 and/or mobile radio home base stations 108. Thus, the UE 112 may select one mobile radio base station 104 or one mobile radio home base station 108 out of the plurality of different mobile radio base stations 104 and/or mobile radio home base stations 108 for mobile radio communication services. In other words, in an embodiment, the UE 112 is expected to be in an area with coverage guaranteed by "standard" 3GPP LTE Macro-Cells 102 served by eNBs 104 and/or 3GPP LTE Micro-Cells 106 served by HeNBs 108. Depending on various criteria, such as subscription type, user profile, and so on, the UE 112 may be allowed to access HeNBs 108 or not. Furthermore, the UE 112 may have certain other priorities, e.g., related to radio link quality, QoS (Quality of Service), etc., on whether to prefer communication connections to HeNBs 108 or standard eNBs 106, or even to a specific type of HeNB 108 or a specific type of a standard eNB 106.

Thus, an embodiment refers to the mobility of UEs 112 between macro radio cells 102 of eNBs 104 and micro radio cells 106 of HeNBs 108.

In various embodiments, as will be described in more detail below, means to the UE may be provided to efficiently detect as to whether a mobile radio base station is a specific type of a mobile radio base station, e.g. as to whether a mobile radio base station is an eNB or a HeNB, assuming that there is potentially a large number of mobile radio base stations of both types available. It may be specifically be avoided that the UE needs to decode system information messages, what would introduce a large latency and might require a considerable amount of battery power.

As also will be described in more detail below, in accordance with various embodiments, a solution is provided that allows the identification of the type of a mobile radio base station (e.g. as to whether the mobile radio base station is an eNB or a HeNB or whether a CSG Cell is configured with partial open access) in a very early stage of the mobile radio cell acquisition procedure. By way of example, various embodiments might allow a UE to have the related knowledge just after synchronization to a mobile radio base station of unknown type.

Figure 2:
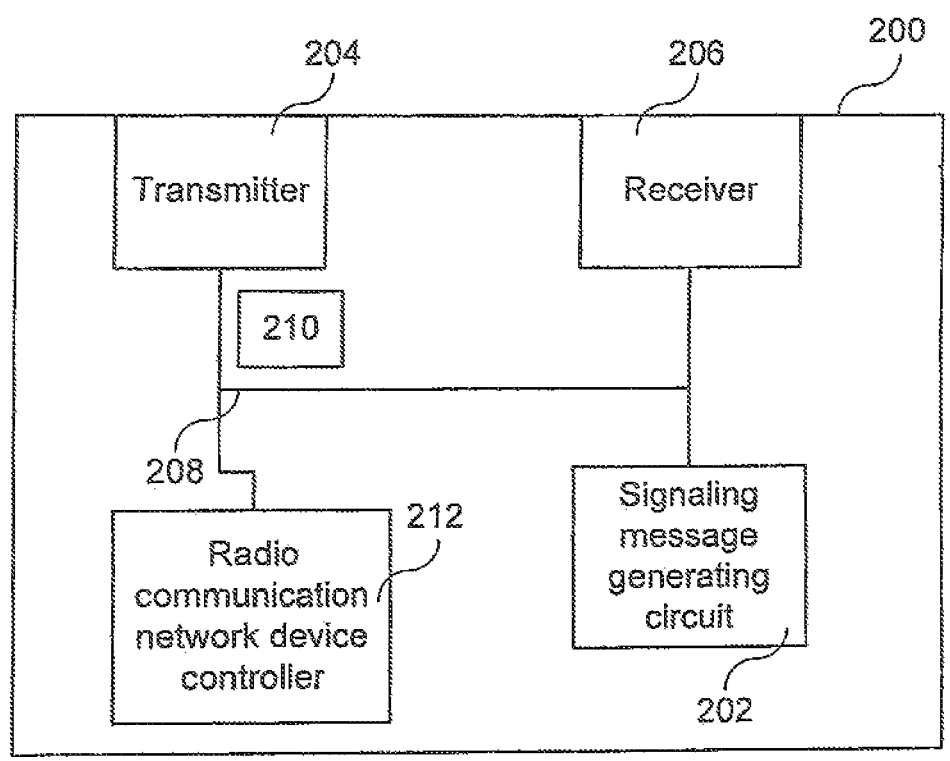
FIG. 2 shows a radio communication network device in accordance with an embodiment.

Furthermore, it is to be noted that in accordance with various embodiments, it is not necessary to change the structure and definition of the physical layer, e.g. the physical layer and its corresponding entities in accordance with e.g. 3GPP LTE. FIG. 2 shows a radio communication network device 200 (such as a mobile radio base station 104 or a mobile radio home base station 108) in accordance with an embodiment. In an embodiment, the radio communication network device 200 may include a signaling message generating circuit 202 configured to generate a signaling message 210 including at least one piece of mobile radio base station type determining information (which may also referred to as a set of mobile radio base station type determining information) indicating a rule as to how the type of a mobile radio base station out of a plurality of types of a mobile radio base station can be derived from a mobile radio base station identifier. Furthermore, a transmitter 204 may be provided. The transmitter 204 may be configured to transmit the signaling message 210 to a mobile radio terminal device, e.g. a UE 112, which will be described in more detail below. As an option, the radio communication network device 200 may further include a receiver 206. The receiver 206 may be configured to receive mobile radio signals from one or a plurality of mobile radio terminal devices, e.g. one or more UEs 112, and/or from a radio network controller device or radio network controller entity such as e.g. an MME. The transmitter 204 and the receiver 206 each may include one or a plurality of antennas. Furthermore, a radio communication network device controller 212 may be provided being configured to provide the conventional control processes to run the radio communication network device 200. The radio communication network device 200 may further include any conventionally provided functionalities/circuits Furthermore, the signaling message generating circuit 202, radio communication network device controller 212, the transmitter 204 and the receiver 206 may be coupled with each other via a coupling structure 208 such as e.g. cables, wires or one or more interconnection busses.

In an embodiment, the transmitter may further be configured to transmit a synchronization message including a mobile radio base station identifier. Furthermore, the signaling message may be a system information message of the cellular communication system, e.g. a system information block message (SIB) or a master information block message (MIB), or a smart card information update message.

In one or more embodiments, a synchronization message may include P-Synch signals and/or S-Synch signals. Furthermore, in one or more embodiments, a signaling message may be understood as a control message including at least one piece of mobile radio base station type determining information.

In another implementation, the signaling message may be a radio resource control protocol (RRC) message, thus, the signaling message may be conveyed in accordance with a radio resource control protocol (RRC). In an embodiment, a radio resource control protocol (RRC) message may be understood as being a message including information in accordance with the radio resource control protocol. In other words, the signaling message may be encoded, transmitted, decoded, and processed according to the RRC (Radio Resource Control) protocol layer procedures.

In an embodiment, the mobile radio base station identifier may be a physical layer cell identifier (PCI).

The type of a mobile radio base station may be an information as to whether the mobile radio base station is a mobile radio macro cell base station (illustratively, a "standard" mobile radio base station) or a mobile radio micro cell home base station (illustratively, a "Home Base Station"). Alternatively or in addition to this, the type of a mobile radio base station may be a type of a mobile radio base station selected from a group consisting of: a closed subscriber group mobile radio home base station, a semi-open mobile radio home base station; and an open group mobile radio home base station. Alternatively or in addition to this, the type of a mobile radio base station may be represented by alternative characteristics of a mobile radio base station, e.g. depending on subscriber contracts, etc.

The radio communication network device 200 may be configured as a Third Generation Partnership Project communication network device such as e.g. as a UMTS (Universal Mobile Telecommunications System) communication network device (also referred to as NodeB), as a FOMA (Freedom of Multimedia Access) communication network device, as a 3GPP LTE (Long Term Evolution) communication network device, as a 3GPP LTE Advance (Long Term Evolution Advance) communication network device, etc.

The rule as to how the type of a mobile radio base station out of a plurality of types of a mobile radio base station can be derived from a mobile radio base station identifier may include a rule selected from a group of rules consisting of:

an assignment of a predefined sub-group of mobile radio base station identifier values to a type of a mobile radio base station of a plurality of types of a mobile radio base station;

a predefined calculation rule to determine the type of a mobile radio base station of a plurality of types of a mobile radio base station; and references thereof to be evaluated in the mobile radio terminal device.

By way of example, the assignment of a predefined sub-group of mobile radio base station identifier values to a type of a mobile radio base station of a plurality of types of a mobile radio base station is selected from a group consisting of:

a predefined portion of a continuous value range of the mobile radio base station identifier values;

a minimum value of a value range of the mobile radio base station identifier values; and a maximum value of a value range of the mobile radio base station identifier values.

FIG. 3 shows a radio communication terminal device 300 (e.g. the UE 112) in accordance with an embodiment.

In an embodiment, the radio communication terminal device 300 may include a receiver 302 configured to receive a synchronization message including a mobile radio base station identifier (e.g. transmitted by the radio communication network device 200 of FIG. 2). Furthermore, the radio communication terminal device 300 may include a memory 304 configured to store at least one piece of signaled mobile radio base station type determining information indicating a rule as to how the type of a mobile radio base station out of a plurality of types of a mobile radio base station can be derived from a mobile radio base station identifier. In other words, the at least one piece of signaled mobile radio base station type determining information indicating a rule as to how the type of a mobile radio base station out of a plurality of types of a mobile radio base station can be derived from a mobile radio base station identifier may be stored in the memory 304.

As will be described in more detail below, in an alternative embodiment, the at least one piece of signaled mobile radio base station type determining information may also be stored in a memory of a radio communication smart card device 400 (see FIG. 4), which may e.g. be inserted in a radio communication terminal device such as e.g. the radio communication terminal device 300.

Moreover, the radio communication terminal device 300 may include a mobile radio base station type determining circuit 306 configured to determine the type of a mobile radio base station using the at least one piece of stored mobile radio base station type determining information and the received mobile radio base station identifier, respectively. Optionally, the radio communication terminal device 300 may include a radio communication terminal device controller 308 configured to provide the as such conventional functions and components of the radio communication terminal device 300. Further, a transmitter 310 including one or more antennas (not shown) may be provided in the radio communication terminal device 300.

Furthermore, the receiver 302, the memory 304, the mobile radio base station type determining circuit 306, the transmitter 310, and the radio communication terminal device controller 308 may be coupled with each other via a coupling structure 312 such as e.g. cables, wires or one or more interconnection busses.

In an embodiment, the receiver 302 may further be configured to receive a signaling message 314 including the at least one piece of mobile radio base station type determining information. As already mentioned above, the signaling message 314 may be a system information message of the cellular communication system, e.g. a system information block message (SIB) or a master information block message (MIB), e.g. in accordance with 3GPP LTE, or a smart card information update message.

Further, the signaling message may be a radio resource control protocol (RRC) message. The mobile radio base station identifier may be a physical layer cell identifier (PCI).

The type of a mobile radio base station is a type of a mobile radio base station selected from a group consisting of: a mobile radio macro cell base station (illustratively, a "standard" mobile radio base station), and a mobile radio home base station (illustratively, a "Home Base Station"). Alternatively or in addition to this, the type of a mobile radio base station may be a type of a mobile radio base station selected from a group consisting of: a closed subscriber group mobile radio home base station, a semi-open mobile radio home base station; and an open group mobile radio home base station. Alternatively or in addition to this, the type of a mobile radio base station may be represented by alternative characteristics of a mobile radio base station, e.g. depending on subscriber contracts, etc.

The radio communication terminal device 300 may be configured as a Third Generation Partnership Project communication terminal device such as e.g. as a UMTS (Universal Mobile Telecommunications System) communication terminal device (also referred to as UE), as a FOMA (Freedom of Multimedia Access) communication terminal device, as an 3GPP LTE (Long Term Evolution) communication terminal device, as an LTE Advance (Long Term Evolution Advance) communication terminal device, etc.

The rule as to how the type of a mobile radio base station out of a plurality of types of a mobile radio base station can be derived from a mobile radio base station identifier may include a rule selected from a group of rules consisting of:

an assignment of a predefined sub-group of mobile radio base station identifier values to a type of a mobile radio base station of a plurality of types of a mobile radio base station;

a predefined calculation rule to determine the type of a mobile radio base station of a plurality of types of a mobile radio base station; and references thereof to be evaluated in the mobile radio terminal device.

By way of example, the assignment of a predefined sub-group of mobile radio base station identifier values to a type of a mobile radio base station of a plurality of types of a mobile radio base station is selected from a group consisting of:

a predefined portion of a continuous value range of the mobile radio base station identifier values;

a minimum value of a value range of the mobile radio base station identifier values; and a maximum value of a value range of the mobile radio base station identifier values.

FIG. 4 shows a radio communication smart card device 400 in accordance with an embodiment. In an embodiment, the radio communication smart card device 400 may be inserted into the radio communication terminal device 300 as shown in FIG. 3 and may be coupled to the other components of the radio communication terminal device 300 e.g. via a smart card interface, e.g. using a smart card Application Toolkit such as e.g. (depending on the communication standard) using a SIM (Subscriber Identification Module) Application Toolkit (also referred to as SAT) or a UMTS SIM (Subscriber Identification Module) Application Toolkit (also referred to as USAT). This is not shown in the figures in detail for reasons of clarity.

As shown in FIG. 4, the radio communication smart card device 400 may include a smart card internal memory 402 configured to store one or more piece(s) of mobile radio base station type determining information indicating at least one rule as to how the type of a mobile radio base station out of a plurality of types of a mobile radio base station can be derived from a mobile radio base station identifier. Furthermore, the radio communication smart card device 400 may include a smart card controller 404 configured to provide smart card internal processes as well as the communication with the other components of the radio communication terminal device 300 such as with the radio communication terminal device controller 308 as described above, e.g. using an optionally provided USAT interface 406. The smart card internal memory 402, the smart card controller 404, and the USAT interface 406 may be coupled with each other via a smart card internal coupling structure 408 such as e.g. a smart card internal bus.

In an embodiment, the smart card internal memory 402 may be configured such that the mobile radio base station type determining information can be changed only by a radio network operator, and thus usually not by the user of the radio communication terminal device 300. Furthermore, the smart card internal memory 402 may be configured to store an elementary file including the one or more piece(s) of mobile radio base station type determining information, as will be described in more detail below.

In a more concrete implementation of various embodiments, the Physical layer cell Identity (PCI) inherent to the synchronization sequences in accordance with 3GPP LTE may be exploited in order to distinguish between eNBs and HeNBs as one example of different types of a mobile radio base station to be determined.

In an embodiment, for this purpose, there may be provided e.g. 504 unique physical-layer cell identities where the physical-layer cell identities may be grouped into e.g. 168 physical-layer cell-identity groups which may contain three unique identities each. A physical-layer cell identity $N_{ID}^{cell}=3N_{ID}^{(1)}+N_{ID}^{(2)}$ may thus be uniquely defined by a number $N_{ID}^{(1)}$ in the range of 0 to 167, and a number $N_{ID}^{(2)}$ in the range of 0 to 2, representing the physical-layer identity within the physical-layer cell-identity group.

This is illustrated in a time/frequency diagram 500 in FIG. 5. The time/frequency diagram 500 shows a time axis 502 and a frequency axis 504 illustrating the structure of a time slot including a plurality of time transmission intervals (TTI) 506, 508, 510, 512, 514 in accordance with an embodiment. As shown in FIG. 5, in an embodiment, a sixth TTI #5 512 may include so-called S-SYNC information. In more detail, a first unused field 516, an S-SYNC field 518 and a second unused field 520 may be provided in the sixth TTI #5 512. In an embodiment, there may be provided two different sets of e.g. 168 binary sequences for the S-SYNC signal in the S-SYNC (secondary synchronization signal) field 518 e.g. in a first TTI #0 506 and in the sixth TTI #5 512, respectively. The sequences may be constructed by an interleaved concatenation of e.g. two sub-sequences of length 31 bits. In one or more embodiments, a sequence d(0), . . . , d(61) used for the second synchronization signal may be an interleaved concatenation of two length-31 binary sequences. The concatenated sequence may be scrambled with a scrambling sequence given by the primary synchronization signal.

As also shown in FIG. 5, in an embodiment, a seventh TTI #6 514 may include a third unused field 522, a P-SYNC (primary synchronization signal) field 524 and a fourth unused field 524 may be provided. In an embodiment, so-called FD Zadoff-Chu sequences of length 62 may be specified, wherein each sequence may be related to one physical layer identifier. Each sequence may be mapped to one of 62 central frequency sub-carriers around a DC frequency carrier (in total, in an embodiment, as shown in FIG. 5, 72 frequency sub-carriers may be reserved). In an embodiment, a sequence d(n) used for the primary synchronization signal may be generated from a frequency-domain Zadoff-Chu sequence according to $$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases}.$$

wherein the Zadoff-Chu root sequence index u may be given by the following table:

| $N_{ID}^{(2)}$ | Root index u |
|---|---|
| 0 | 25 |
| 1 | 29 |
| 2 | 34 |

In one or more embodiments, the preamble sequences to be transmitted may be constructed by a suitable mapping of these preamble sequences onto selected frequency carriers in the OFDM symbols.

As will be described in more detail below, in an embodiment, each MNO (Mobile Network Operator) may be allowed to reserve an arbitrary number of PCIs for mobile radio home base stations (e.g. HeNBs) and the remaining ones for mobile radio base stations (e.g. eNBs) in order to reduce the synchronization complexity for mobile radio communication terminal devices (e.g. UEs) targeting at communicating with an mobile radio base stations (e.g. eNBs) or mobile radio home base stations (e.g. HeNBs) only—this may be achieved in an example by assigning a sub-group of $N_{ID}^{(2)}=\{0,1,2\}$ to mobile radio base stations (e.g. eNBs) or mobile radio home base stations (e.g. HeNBs) exclusively. Then, the whole range of $N_{ID}^{(1)}$ may always be searched for while only the sub-space of $N_{ID}^{(2)}=\{0,1,2\}$ that is of interest to the mobile radio communication terminal device (e.g. UE) may be searched for during the synchronization phase. In various embodiments, this may enable the UE to find out the status of an eNB/eHNB just by evaluating the primary sychronization symbol as defined e.g. in 3GPP 36.211. A consideration of the secondary synchronization signal may not be required if e.g. N_ID^(2) already indicates that the eNB/eHNB type is not the type desired by the UE. This additionally may speed up the process.

According an embodiment, e.g. the UE 112 may be informed about an MNO (Mobile Network Operator) preferred PCI subsets for HeNBs by means of a smart card device (for example a SIM-Card (SIM—Subscriber Identity Module) device or a UICC (UICC—Universal Integrated Circuit Card) device with integrated (U)SIM (USIM—Universal Subscriber Identity Module). Smart card devices usually offer different types of memory. While a certain portion of the so-called 'Elementary Files' stored in a first memory (or a first memory portion) of a smart card device can be written/updated exclusively by the MNO (Mobile Network Operator), another memory (or another memory portion) or other memories (or other memory portions) may also be overwritten/updated by the user of the smart card device without mobile network operator control. A first type of 'Elementary Files' may be provided for OTA data provisioning methods (OTA—over the air) after hand out of the smart card device to the user. According to one embodiment, the PCI values for HeNBs may be assigned in a semi-static fashion and could be altered for example via over-the-air SIM Card update processes depending on the subscription type or any other criteria (should the need arise).

By way of example, said SIM Card update processes can be triggered by transmitting a smart card update information message comprising at least one piece of mobile radio base station type determining information from the MNO's core network to the mobile radio terminal device.

As already mentioned above, in an embodiment, it is possible for an MNO (Mobile Network Operator) to choose a semi-static PCI configuration approach by storing the relevant information in a smart card device connectable to a mobile radio communication device such as e.g. a mobile radio communication device, e.g. a UE 112. Various types of smart card devices may be used in various embodiments such as e.g. those smart card devices that are specified in mobile radio communication systems according to 3GPP communication standards such as e.g. in a UMTS communication standard such as e.g. in an 3GPP LTE communication standard.

In the context of one embodiment, a UICC (UICC—Universal Integrated Circuit Card) with at least one integrated (U)SIM (USIM—Universal Subscriber Identity Module) may be provided. The general principles disclosed here can be easily applied to other variants of smart card devices in alternative embodiments.

According to one embodiment, the PCI value assignments may be stored in a part of a USIM's memory, e.g. in the smart card internal memory 402, wherein the memory may be configured such that it may be updated (i.e. overwritten) during an operation for example using as such conventional mechanisms, such as USAT (Universal SIM Application Toolkit) or CAT (Card Application Toolkit) transactions and commands between the mobile device and the smart card device; and it is controlled exclusively by the MNO (Mobile Network Operator) (i.e. that it is write-protected against user manipulation).

In an embodiment, the following changes may be provided to the conventional USIM Service Tables in order to indicate to a UE (e.g. the UE 112), which USIM services are supported by the corresponding smart card device.

TABLE 1

The 'Elementary File' (EF) "USIM Service Table" in accordance with an embodiment

| Identifier: '6F38' SFI: '04' | Structure: transparent | Mandatory |
|---|---|---|
| File size: X bytes, X >= 1 | | Update activity: low |

| Access Conditions: | |
|---|---|
| READ | PIN |
| UPDATE | ADM |
| DEACTIVATE | ADM |
| ACTIVATE | ADM |

| Bytes | Description | M/O | Length |
|---|---|---|---|
| 1 | Services n °1 to n °8 | M | 1 byte |
| 2 | Services n °9 to n °16 | O | 1 byte |
| 3 | Services n °17 to n °24 | O | 1 byte |
| 4 | Services n °25 to n °32 | O | 1 byte |
| Etc. | | | |
| X | Services n °(8X-7) to n °(8X) | O | 1 byte |

TABLE 2

Service n °80 'PCI Assignment to Base Station Classes' is new in accordance with an embodiment

| Services Contents: | Service n °1: | Local Phone Book |
|---|---|---|
| | Service n °2: | Fixed Dialling Numbers (FDN) |
| | Service n °3: | Extension 2 |
| | Service n °4: | Service Dialling Numbers (SDN) |
| | Service n °5: | Extension3 |
| | Service n °6: | Barred Dialling Numbers (BDN) |
| | Service n °7: | Extension4 |
| | Service n °8: | Outgoing Call Information (OCI and OCT) |
| | Service n °9: | Incoming Call Information (ICI and ICT) |
| | Service n °10: | Short Message Storage (SMS) |
| | . | |
| | . | |
| | . | |
| | Service n °76 | GBA-based Local Key Establishment Mechanism |
| | Service n °77 | Terminal Applications |
| | Service n °78 | Service Provider Name Icon |
| | Service n °79 | PLMN Network Name Icon |
| | Service n °80 | PCI Assignment to Base Station Classes |

As is shown in table 2, compared with the conventional services, the service n 80, also referred to as "PCI Assignment to Base Station Classes" has been added in accordance with an embodiment.

In the following, a possible realization of the "PCI Assignment to Base Station Classes" will be described in more detail (service table entry #80):

| Identifier: '6FE0' | Structure: Linear fixed | | Optional |
|---|---|---|---|
| Record length: 6 bytes | | Update activity: low | |
| Access Conditions: READ PIN UPDATE ADM DEACTIVATE ADM ACTIVATE ADM | | | |

| Bytes | Description | M/O | Length |
|---|---|---|---|
| 1 | BS type of first PCI range | M | 1 byte |
| 2 | Upper limit for PCI range #1 | M | 1 byte |
| 3 | BS type of second PCI range | O | 1 byte |
| 4 | Upper limit for second PCI range | O | 1 byte |
| 5 | BS type of third PCI range | O | 1 byte |
| 6 | Upper limit for third PCI range | O | 1 byte |

Pin access restriction to read the contents of this elementary file. Updates require ADM (= MNO) authentication.

Thus, illustratively, the structure of the service "PCI Assignment to Base Station Classes" may include an access conditions field and additional six bytes for further parameter definitions. In this example, the access conditions field may be set such that only the user being identified by the PIN (Personal Identification Number) is allowed to read the content of this service structure. Furthermore, the access operations to update, deactivate or activate the service structure or the service itself are only allowed for the Mobile Network Operator (indicated in the above structure by "ADM").

The structure and meaning of the six bytes will be described in more detail below:

BS Type Coding (e.g. used for the fields "BS type of first PCI range" (Byte 1), "BS type of second PCI range" (Byte 3), and "BS type of third PCI range" (Byte 5)): This respective Byte may indicate the type of the PCI value range in question. Bit b1 may be set to '1' when the mobile radio base station (BS) is a "Standard" eNodeB (e.g. a macro radio cell mobile radio base station), bit b2 may be set to '1' when the mobile radio base station (BS) is a Home eNodeB (e.g. a micro radio cell mobile radio base station), etc. Bits b5-b8 may be reserved for future use.

| b8 | b7 | b6 | b5 | b4 | B3 | b2 | b1 | |
|----|----|----|----|----|----|----|----|---|
|    |    |    |    | 0  | 0  | 0  | 1  | Standard eNodeB |
|    |    |    |    | 0  | 0  | 1  | 0  | Home eNodeB |
|    |    |    |    | 0  | 1  | 0  | 0  | Home eNodeB configured as CSG Cell |
|    |    |    |    | 1  | 0  | 0  | 0  | Home eNodeB configured with partial open access Reserved for future use |

Upper Limit (e.g. used for the fields "Upper limit for PCI range #1" (Byte 2), "Upper limit for second PCI range" (Byte 4), and "Upper limit for third PCI range" (Byte 6)): This respective Byte may indicate the upper limit of the PCI value range in question. As there may be 504 PCI values 8 bits may be enough to set the upper limit per range at bit 256. The next PCI value range will start with value '0' from that limit upwards as described in FIG. 6 which will be described in more detail below.

Figure 6:
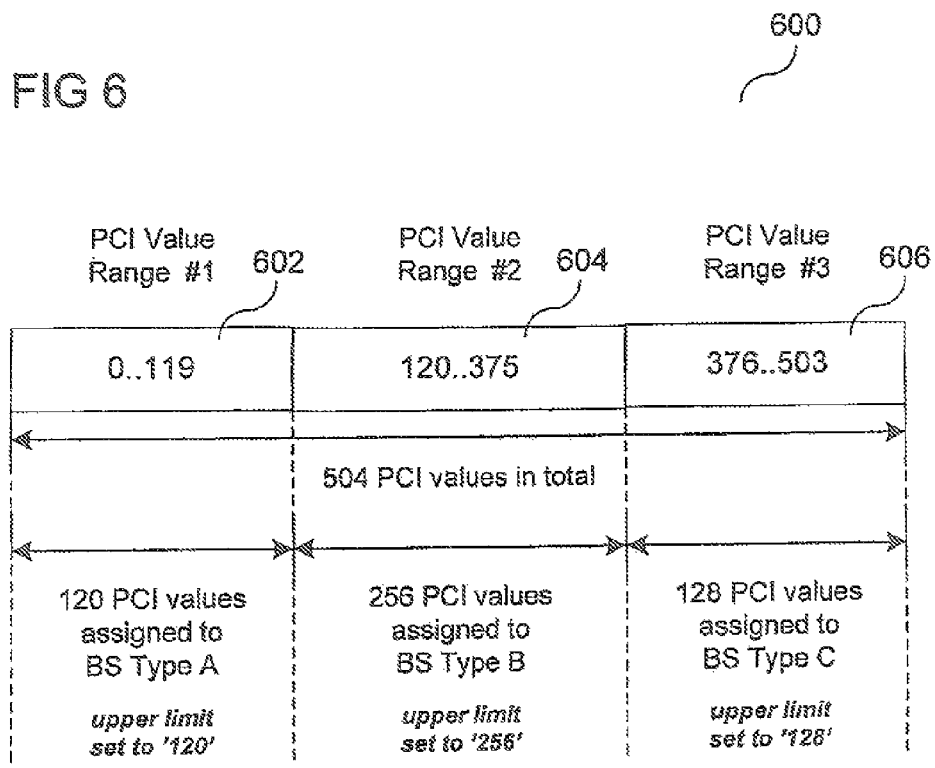
FIG. 6 shows an example for a PCI assignment to three different types of mobile radio base stations for storage in a radio communication smart card device in accordance with an embodiment.

FIG. 6 shows an example for a PCI assignment to three different types of mobile radio base stations for storage in a radio communication smart card device in accordance with an embodiment in a diagram 600.

As shown in FIG. 6, a first PCI value range 602 may be in the range from 0 to 119, thereby allowing 120 PCI values to be assigned to a first mobile radio base station type A (with an upper value limit set to "120"). Furthermore, a second PCI value range 604 may be in the range from 120 to 375, thereby allowing 256 PCI values to be assigned to a second mobile radio base station type B (with an upper value limit set to "256"). Finally, in this implementation, a third PCI value range 606 may be in the range from 376 to 503, thereby allowing 128 PCI values to be assigned to a third mobile radio base station type C (with an upper value limit set to "128").

The amended 'Elementary File' (EF) for Service #80 (tagged with identifier '6FE0') in this example may allow specifying up to three PCI value ranges for different types of mobile radio base stations. Other coding alternatives according to the details on PCI assignments as will be described below may be provided in alternative embodiments.

With this embodiment, PCI values can be assigned to different types of mobile radio base stations in a semi-static fashion by the MNO (Mobile Network Operator). Should a need arise, the assignments may be altered during operation depending on the subscription type or any other criteria, e.g. carried out by the MNO.

According to another embodiment a radio communication terminal device such as e.g. a UE (e.g. the UE 112) may be informed about the PCI subsets of HeNBs by means of RAT (Radio Access Technology) signaling between the MNO's (Mobile Network Operator) core network and the radio communication terminal device such as e.g. a UE (e.g. the UE 112). Since the corresponding assignment may change over space (depending on the number of deployed HeNBs, etc.) and time, it may be provided that the radio communication terminal device such as e.g. a UE (e.g. the UE 112) can be informed about changes in the range of PCI values dynamically. In an embodiment, it may be provided to use the 3GPP LTE RRC (Radio Resource Control) layer 3 protocol for signaling. By way of example, the system information (SI) broadcast of the mobile communication network may be enhanced accordingly. In this case the MNO (Mobile Network Operator) may have full flexibility and may chose to update/modify the assignment of PCI values quickly whenever a need arises. A radio communication terminal device such as e.g. a UE (e.g. the UE 112) may only need to receive and decode the system information (SI) broadcast once in accordance with an embodiment. For all other suitable mobile radio cells in the same location, there may be no need to perform these time and energy consuming exercise again, as the suitability of other (neighbouring) mobile radio cells can be detected simply be means of receiving and analysing the PCIs. This may allow a radio communication terminal device such as e.g. a UE (e.g. the UE 112) to know just after performing the synchronization whether a particular mobile radio base station is of a specific (predefined) type, e.g. whether a particular mobile radio base station is a HeNB or a standard eNB.

This embodiments may have one or more or even all of the following effects:

Information can be altered fast and dynamically by the MNO (Mobile Network Operator).

Information can depend on location (e.g., tracking area).

The user may set the desired radio communication terminal device behaviour such as e.g. a UE behaviour (e.g., by pushing a button or ticking a box in the UE's menu) to restrict/enable/prioritize access to a certain mobile radio base station type.

In the sequel, it is explained how the information related to the PCIs (reserved either for HeNBs or standard eNBs, for example) may be included in a system information message such as e.g. as SIB (system information block) or a MIB (master information block). In more detail, a new information element 'pci-Info' may be introduced. Without loss of generality a specific implementation example from the mobile radio base station perspective is given. Afterwards, the radio communication terminal device such as e.g. a UE (e.g. the UE 112) can operate based on the process illustrated in a flow diagram 700 in FIG. 7, which will be described in more detail below.

In an embodiment, and in accordance with 3GPP LTE, a so-called MasterInformationBlock (MIB) may be defined that informs the UE 112 about the most essential physical layer parameters of the mobile radio cell that are required by a UE to receive further system information. In an embodiment, the list of these most essential physical layer parameters may include:

| dl-SystemBandwidth | (details are for further study); |
| numberOfTransmitAntennas | BIT STRING (SIZE 4); |
| phich-Configuration | PHICH-Configuration; |
| systemFrameNumber | BIT STRING (SIZE 8). |

In another embodiment, and in accordance with 3GPP LTE, a so-called SystemInformationBlock1 may be defined that contains information relevant when evaluating if a UE (e.g. UE 112) is allowed to access a mobile radio cell and defines the scheduling of other System Information Blocks (SIBs). In an embodiment, the list of information elements in this container may include:

| | |
|---|---|
| cellAccessRelatedInformation | SEQUENCE |
| plmn-IdentityList | SEQUENCE (1 . . . 6) |
| plmn-Identity | PLMN Identity |
| cellReservedForOperatorUse | ENUMERATED {reserved, notReserved} |
| trackingAreaCode | Tracking Area Code |
| cellIdentity | Cell Identity |
| cellBarred | ENUMERATED {barred, notBarred} |
| intraFrequencyCellReselection | BOOLEAN |
| cellReservationExtension | ENUMERATED {reserved, notReserved} |
| csg-Indication | BOOLEAN |
| cellSelectionInfo | SEQUENCE |
| q-Rxlevmin | INTEGER (−60 . . . −28) |
| q-Rxlevminoffset | INTEGER (1 . . . 8) |
| frequencyBandIndicator | INTEGER (1 . . . 64), |
| schedulinInformation | SEQUENCE (1 . . . maxSI-Message) |
| si-Periodicity | ENUMERATED {ms80, ms160, ms320, . . . , ms5120}, |
| sib-MappingInfo | SEQUENCE (1 . . . maxSIB) OF SIB-Type |
| tdd-Configuration | TDD-Configuration |
| si-WindowLength | ENUMERATED (value range is for further study) |
| systemInformationValueTag | INTEGER (value range is for further study) |
| mbsfn-SubframeConfiguration | SEQUENCE (for further study in which SIB this IE should be placed) |
| radioframeAllocation | SEQUENCE (value range is for further study) |
| subframeAllocation | INTEGER (1 . . . 7) |

In another embodiment, and in accordance with 3GPP LTE, further so-called SystemInformationBlocks may be defined and provided for various purposes. These may be referred to as SIB Types 2 to 8. Each of them may contain a number of different Information Elements (IE).

A short overview is given in the following:

SIB-Type2 may contain common and shared channel information.

SIB-Type3 may contain mobile radio cell re-selection information, mainly related to the serving mobile radio cell.

SIB-Type4 may contain information about the serving frequency and intra-frequency neighbouring mobile radio cells relevant for mobile radio cell re-selection. This may include mobile radio cell re-selection parameters common for a frequency as well as mobile radio cell specific re-selection parameters.

SIB-Type5 may contain information about other E-UTRA frequencies and inter-frequency neighbouring mobile radio cells relevant for mobile radio cell re-selection. This may include mobile radio cell re-selection parameters common for a frequency as well as mobile radio cell specific re-selection parameters.

SIB-Type6 may contain information about UTRA frequencies and UTRA neighbouring mobile radio cells relevant for mobile radio cell re-selection. This may include mobile radio cell re-selection parameters common for a frequency as well as mobile radio cell specific re-selection parameters.

SIB-Type7 may contain information about GERAN frequencies relevant for mobile radio cell re-selection. This may include mobile radio cell re-selection parameters for each frequency.

SIB-Type8 may contain information about CDMA2000 frequencies and CDMA2000 neighbouring mobile radio cells relevant for mobile radio cell re-selection. This may include mobile radio cell re-selection parameters common for a frequency as well as mobile radio cell specific re-selection parameters.

In order to allow a UE (e.g. the UE 112) to identify the class or type of a mobile radio base station (examples: "standard eNB", "HeNB operating as a CSG Cell", or "HeNB with partial open access", etc.) in a very early stage of the communication connection set-up process, in an embodiment, a new Information Element (IE) may be added in one of the System Information Blocks as described above or a new System Information Block may be defined for this purpose:
- addition to the MIB (in this context it should be noted that the MIB is concerned with physical layer parameters);
- addition to SIB Type 1;
- addition to any other of the existing SIBs of types 2-8;
- definition of a new, separate System Information Block SIB Type X.

According to one embodiment, the most essential physical layer parameters of MIB may contain further system information as follows:

| | |
|---|---|
| dl-SystemBandwidth | (details are for further study); |
| numberOfTransmitAntennas | BIT STRING (SIZE 4); |
| phich-Configuration | PHICH-Configuration; |
| systemFrameNumber | BIT STRING (SIZE 8); |
| pci-Info | SEQUENCE (1 . . . 4); |
| cell-type | ENUMERATED {standard, HeNB-CSG, etc.}; |
| start-value | BIT STRING (SIZE9); |
| end-value | BIT STRING (SIZE9) |

The new Information Element "pci-Info" in this example allows to specify up to four PCI value ranges for different types of mobile radio base stations. Basically, different numbers of PCI value ranges and other coding alternatives according to the details given below are provided in alternative embodiments.

In accordance with various embodiments, e.g. in accordance with all embodiments described above, details of PCI assignments for HeNBs/eNBs may include one or more of the following options:
- the sub-group of $N_{ID}^{(2)} = \{0,1,2\}$ to be assigned; or
- a starting/ending cell ID $N_{ID}^{cell} = 3N_{ID}^{(1)} + N_{ID}^{(2)}$ may be communicated; or
- the starting cell ID (e.g., starting PCI) may be set to '0' and the ending cell ID may be communicated only; or
- the ending cell ID (e.g., ending PCI) may be set to the max. value and the starting cell ID (e.g., starting PCI) may be communicated only; or
- a calculation rule may be communicated (e.g., every third PCI belongs to a standard eNB, the rest belongs to HeNB operating as CSG Cells); or
- deviation from a default value range (e.g., if the default range assigned to HeNBs is 0 . . . 50, this range could be extended/restricted in certain steps).

In an embodiment, the acquisition of PCIs reserved for HeNBs or standard eNBs, respectively, by a radio communication terminal device such as e.g. a UE may be provided in accordance with the procedure as shown in the flow diagram 700 in FIG. 7.

In 702, a UE (e.g. the UE 112) may be switched on and may detect various existing mobile radio base stations (e.g. eNodeBs) with no knowledge about the respective type of the detected mobile radio base stations, e.g. with no knowledge as to whether the respectively detected mobile radio base station is a "standard" (macro radio cell) mobile radio base station or a mobile radio home (micro radio cell) base station.

In 704, the UE (e.g. the UE 112) may connect to one of the detected mobile radio base stations with any suitable way of choosing it among the available detected mobile radio base stations (e.g., random choice, selection of the mobile radio base station with the strongest reception signal, selection of the mobile radio base station with the highest SINR (Signal-Interference-Noise-Ratio, etc.).

In 706, the UE (e.g. the UE 112) may decode System Information according to the descriptions above (for example: MIB, SIB Type 1, any other of the existing SIB Types, or a new SIB Type to be defined) from the selected mobile radio base station and may recover PCIs reserved for HeNBs and standard eNBs respectively, for example.

In 708, if required or desired, the UE (e.g. the UE 112) may connect to other mobile radio base stations (whose type is unknown to the UE (e.g. the UE 112) for the time-being) and may check the PCI during the synchronization phase. If the PCI is not included in the suitable sub-set (i.e., reserved for HeNBs, standard eNBs, etc.) recovered in the System Information before, the connection may be abandoned directly after the synchronization phase (which may be required to obtain the PCI). This process may be repeated until a suitable mobile radio base station type is found or the UE (e.g. the UE 112) finds that none of the available mobile radio base stations is suitable.

FIG. 8 shows a flow diagram 800 illustrating a method for determining the type of a mobile radio base station in accordance with an embodiment.

The method may include, in 802, receiving a synchronization message including a mobile radio base station identifier. Furthermore, in 804, the type of a mobile radio base station may be determined using at least one piece of a previously signaled and stored mobile radio base station type determining information indicating a rule as to how the type of a mobile radio base station out of a plurality of types of a mobile radio base station can be derived from a mobile radio base station identifier and the received mobile radio base station identifier.

In an example of this embodiment, the method may further include receiving a signaling message including the at least one piece of mobile radio base station type determining information. In another example of this embodiment, the signaling message may be a type of signaling message selected from a group consisting of: a system information message of the cellular communication system; and a smart card information update message. In yet another example of this embodiment, the signaling message may be a system information block message or a master information block message. In yet another example of this embodiment, the signaling message may be conveyed in accordance with a radio resource control protocol. In yet another example of this embodiment, the mobile radio base station identifier may be a physical layer cell identifier. In yet another example of this embodiment, the type of a mobile radio base station is a type of a mobile radio base station selected from a group consisting of: a mobile radio macro cell base station; and a mobile radio micro cell home base station. In yet another example of this embodiment, the type of a mobile radio base station is a type of a mobile radio base station selected from a group consisting of: a closed subscriber group mobile radio home base station; a semi-open mobile radio home base station; and an open group mobile radio home base station. In yet another example of this embodiment, the method may be carried out by a radio communication terminal device. In yet another example of this embodiment, the radio communication terminal device is a Third Generation Partnership Project communication terminal device. In yet another example of this embodiment, the radio communication terminal device is a Long Term Evolution communication terminal device. In yet another example of this embodiment, the rule as to how the type of a mobile radio base station out of a plurality of types of a mobile radio base station can be derived from a mobile radio base station identifier including a rule selected from a group of rules consisting of: an assignment of a predefined sub-group of mobile radio base station identifier values to a type of a mobile radio base station of a plurality of types of a mobile radio base station; a predefined calculation rule to determine the type of a mobile radio base station of a plurality of types of a mobile radio base station (or references to the assignments or assignment rules listed above); and references thereof to be evaluated by the mobile radio terminal device. In yet another example of this embodiment, the assignment of a predefined sub-group of mobile radio base station identifier values to a type of a mobile radio base station of a plurality of types of a mobile radio base station is selected from a group consisting of: a predefined portion of a continuous value range of the mobile radio base station identifier values; a minimum value of a value range of the mobile radio base station identifier values; and a maximum value of a value range of the mobile radio base station identifier values.

FIG. 9 shows a flow diagram 900 illustrating a method for signaling at least one piece of mobile radio base station type determining information in accordance with an embodiment.

The method may include, in 902, generating a signaling message including at least one piece of mobile radio base station type determining information indicating a rule as to how the type of a mobile radio base station out of a plurality of types of a mobile radio base station can be derived from a mobile radio base station identifier. Furthermore, in 904, the signaling message may be transmitted to a mobile radio terminal device.

In an example of this embodiment, the method may further include transmitting a synchronization message including a mobile radio base station identifier. In another example of this embodiment, the signaling message may be a type of signaling message selected from a group consisting of: a system information message of the cellular communication system; and a smart card information update message. In yet another example of this embodiment, the signaling message may be a system information block message or a master information block message. In yet another example of this embodiment, the signaling message may be conveyed in accordance with a radio resource control protocol. In yet another example of this embodiment, the mobile radio base station identifier may be a physical layer cell identifier. In yet another example of this embodiment, the type of a mobile radio base station may be a type of a mobile radio base station selected from a group consisting of: a mobile radio macro cell base station; and a mobile radio micro cell home base station. In yet another example of this embodiment, the type of a mobile radio base station may be a type of a mobile radio base station selected from a group consisting of: a closed subscriber group mobile radio home base station; a semi-open mobile radio home base station; and an open group mobile radio home base station. In yet another example of this embodiment, the method may be carried out by a radio communication network device. In yet another example of this embodiment, the radio communication network device is a Third Generation Partnership Project communication network device. In yet another example of this embodiment, the radio communication network device is a Long Term Evolution communication network device. In yet another example of this embodiment, the rule as to how the type of a mobile radio base station out of a plurality of types of a mobile radio base station can be derived from a mobile radio base station identifier includes a rule selected from a group of rules consisting of: an assignment of a predefined sub-group of mobile radio base station identifier values to a type of a mobile radio base station of a plurality of types of a mobile radio base station; and a predefined calculation rule to determine the type of a mobile radio base station of a plurality of types of a mobile radio base station (or references to the assignments or assignment rules listed above). In yet another example of this embodiment, the assignment of a predefined sub-group of mobile radio base station identifier values to a type of a mobile radio base station of a plurality of types of a mobile radio base station may be selected from a group consisting of: a predefined portion of a continuous value range of the mobile radio base station identifier values; a minimum value of a value range of the mobile radio base station identifier values; and a maximum value of a value range of the mobile radio base station identifier values.

In various embodiments, an approach of signaling separate (sets of) PCIs for HeNBs and/or standard eNBs is provided.

In various embodiments, a radio communication terminal device such as e.g. a UE may be provided with said (sets of) PCIs e.g. using dedicated (operator controlled) 'Elementary Files' (EF) in a smart card (such as a SIM Card or a UICC with integrated (U)SIM), or by using RAT (Radio Access Technology) signalling (e.g., use SIB enhancements in layer 3 RRC protocol as outlined above).

In various embodiments, an assignment of a sub-group of $N_{ID}^{(2)}=\{0,1,2\}$ to eNBs or HeNBs exclusively, may be provided.

In various embodiments, Over-the-Air transportation of PCI assignment may be provided by communicating the subgroups:
- as the sub-group of $N_{ID}^{(2)}=\{0,1,2\}$ to be assigned to eNBs, or
- as a starting/ending cell ID $N_{ID}^{cell}=3N_{ID}^{(1)}+N_{ID}^{(2)}$ is communicated, or
- as the starting cell ID is set to '0' and the ending cell ID is communicated only, or
- as the ending cell ID is set to the max. value and the starting cell ID is communicated only, or
- utilizing calculation rules, or
- by means of specifying deviations from predefined values.

In various embodiments, various types of HeNBs, e.g. "open" HeNBs, "semi-open" HeNBs and "closed" HeNBs may be introduced. Then, PCIs may not only be reserved for two types of devices (HeNBs and standard eNBs), but for more than two types (e.g., standard eNBs, "open" HeNBs, "semi-open" HeNBs and "closed" HeNBs) to allow for finer distinction.

It should further be noted that various embodiments may be applied to any other radio communication system, e.g. in accordance with WiMax, e.g. in accordance with IEEE 802.16m. In one or more alternative embodiments, the above described embodiments may also be applied to a radio communication system in accordance with IEEE 802.16e.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method to determine cell access during a cell search, comprising:
    detecting cells in a mobile network using a user equipment (UE);
    selecting one of the cells based on a strongest reception signal received by the UE;
    receiving a primary synchronization signal and a secondary synchronization signal;
    receiving a system information block message from the selected cell;
    determining a cell identity from the system information block, wherein the cell identity is determined using cell identity groups and physical-layer identities;
    receiving another system information block message from the selected cell;
    determining a physical cell identity range from the another system information block;
    retrieving an identifier stored in the UE, wherein the identifier is stored on a white list; and
    determining whether the UE can access the selected cell.

2. The method of claim 1, further comprising receiving a manually selected input from a user to enable access to a certain base station type.

3. The method of claim 1, wherein the identifier is stored on a universal subscriber identity module (USIM).

4. The method of claim 1, further comprising receiving a master information block (MIB) message, wherein the MIB message comprises downlink bandwidth and system frame number information.

5. The method of claim 1, wherein the system information block message is a system information block type 1 message and the another system information block message is a system information block type 4 message.

6. The method of claim 1, wherein the system information blocks are broadcast in Radio Resource Control (RRC) Protocol Layer messages.

7. The method of claim 1, wherein the physical cell identity (PCI) range represents PCI values assigned to closed subscriber group (CSG) cells.

8. A user equipment (UE), comprising:
    a controller to detect cells in a mobile network and to select one of the cells based on a strongest reception signal received by the UE;
    a receiver to receive synchronization signals comprising a primary synchronization signal and a secondary synchronization signal, and to receive system information blocks from Radio Resource Control (RRC) Protocol Layer messages from the selected cell;

an interface to couple a subscriber identity module, the subscriber identity module to store an identifier;

circuitry to determine a cell identity from one of the system information blocks, wherein the cell identity is determined using cell identity groups and physical-layer identities, to determine a physical cell identity range from another system information block, to retrieve an identifier; and to determine whether the UE can access the selected cell.

9. The user equipment of claim 8, wherein the mobile network is deployed by an operator and wherein the operator is allowed to reserve a plurality of physical cell identity (PCI) values.

10. The user equipment of claim 8, wherein the cell identity is determined using 168 physical-layer cell identity groups and three physical-layer identities.

11. The user equipment of claim 8, wherein the receiver is to receive the identifier in a signaling message.

12. The user equipment of claim 11, wherein the signaling message is received from an LTE macro radio cell (eNB).

13. The user equipment of claim 8, wherein the user equipment is to use the identifier to determine whether the UE can access the selected cell.

14. The user equipment of claim 13, further comprising a memory to store the identifier.

15. A radio communication network device, comprising:
a plurality of antennas;
a transmitter to transmit synchronization signals in a cell of a mobile network, wherein the synchronization signals comprise a primary synchronization signal and a secondary synchronization signal, and to transmit a master information block and system information blocks in the cell using Radio Resource Control (RRC) Protocol Layer messages;
a signaling message generating circuit to indicate a cell identity in one of the system information blocks, wherein the cell identity is determined using cell identity groups and physical-layer identities, and to determine a physical cell identity range for another system information block, wherein a user equipment (UE) in the cell is to retrieve an identifier and determine whether the UE can access the cell in the mobile network.

16. The radio communication network device of claim 15, wherein the radio communication network device is selected from a group consisting of a macro radio cell (eNB) and a micro cell (HeNB).

17. The radio communication network device of claim 15, wherein the cell identity is determined using 168 physical-layer cell identity groups and three physical-layer identities.

18. The radio communication network device of claim 15, wherein the transmitter is to transmit the identifier in a signaling message selected from a group consisting of:
a system information message; and
a smart card information update message.

19. The radio communication network device of claim 18, wherein the signaling message is conveyed in accordance with the RRC protocol.

20. The radio communication network device of claim 15, wherein the user equipment is to use the identifier to determine whether the UE can access a selected cell.

21. One or more non-transitory, computer-readable media having instructions that, when executed, cause a user equipment (UE) to:
detect cells in a mobile network;
select one of the cells based on a strongest reception signal received by the UE;
receive a primary synchronization signal and a secondary synchronization signal;
receive a system information block message from the selected cell;
determine a cell identity from the system information block, wherein the cell identity is determined using cell identity groups and physical-layer identities;
receive another system information block message from the selected cell;
determine a physical cell identity range from the another system information block;
retrieve an identifier stored in the UE, wherein the identifier is stored on a white list; and
determine whether the UE can access the selected cell.

22. The one or more non-transitory, computer-readable media of claim 21, wherein the instructions, when executed, further cause the UE to receive a manually selected input from a user to enable access to a certain base station type.

23. The one or more non-transitory, computer-readable media of claim 21, wherein the identifier is stored on a universal subscriber identity module (USIM).

24. The one or more non-transitory, computer-readable media of claim 21, wherein the instructions, when executed, further cause the UE to receive a master information block (MIB) message, wherein the MIB message comprises downlink bandwidth and system frame number information.

25. The one or more non-transitory, computer-readable media of claim 21, wherein the system information block message is a system information block type 1 message and the another system information block message is a system information block type 4 message.

26. The one or more non-transitory, computer-readable media of claim 21, wherein the system information blocks are broadcast in Radio Resource Control (RRC) Protocol Layer messages.

27. The one or more non-transitory, computer-readable media of claim 21, wherein the physical cell identity (PCI) range represents PCI values assigned to closed subscriber group (CSG) cells.

* * * * *